United States Patent Office 3,635,871
Patented Jan. 18, 1972

3,635,871
CRUSHED POLYURETHANE ELASTOMERIC PRODUCT CONTAINING AN AMIDE AND METHOD FOR PRODUCING THE SAME
Takuo Kawaguchi and Kanji Matsubayashi, Kurashiki, Japan, assignors to Kurashiki Rayon Co., Ltd., Kurashiki, Japan
No Drawing. Continuation-in-part of application Ser. No. 667,661, Sept. 14, 1967. This application Oct. 27, 1969, Ser. No. 869,928
Claims priority, application Japan, Oct. 21, 1966, 41/69,350
Int. Cl. C08g 51/44, 22/16, 53/00
U.S. Cl. 260—32.6
4 Claims

ABSTRACT OF THE DISCLOSURE

The crushed polyurethane elastomeric product homogeneously containing an amide, which is excellent solubility in the solvents, good storage stability and easy handling to transportation, is produced by heat-treating the pulverized polyurethane elastomer, which was produced by the method of U.S. Pat. No. 3,446,771, at the range of the temperature of above 100° C. to 155° C. in the presence of an amide about 2 to 60 percent, based on the total weight of the polyurethane elastomer and an amide.

---

This invention relates to the crushed polyurethane elastomeric product containing an amide and the method thereof.

This application is a continuation-in-part of our copending application Ser. No. 667,661 filed on Sept. 14, 1967, and now abandoned.

The present invention relates, more particularly to the improvement of manufacturing crushed polyurethane elastomeric product described in the U.S. patent application Ser. No. 617,511 and now patented U.S. Pat. No. 3,446,771.

We have already disclosed in U.S. Pat. No. 3,446,771, that the method of manufacturing pulverized polyurethane elastomer which consists the steps of carrying out the mechanical mixing and crushing the polyurethane elastomer in the presence of an amide, such as dimethyl formamide, diethyl formamide or dimethyl acetamide in the process for producing pulverized elastomers by (1) mechanically mixing, while polymerizing to form a polyurethane elastomer, (a) a polymeric diol having a molecular weight from about 400 to about 8,000, (b) a monomeric diol having a molecular weight of from 62 to about 400, and (c) an organic diisocyanate, (2) continuing said mechanical mixing after said polyurethane has reached a solid state and (3) crushing said polyurethane to form a pulverized elastomer by mechanical mixing.

But this method carried out in the batch, which is the mixers having crushing means, such as Werner type mixers or kneaders, therefore, the differences of the properties, especially the solubility in the solvent, viscosity change of the solution, etc. of the polyurethane are often occurred among the batches.

The occurrence of this phenomenon is caused by the variation of the purities of the starting materials, particularly due to the changes of the starting materials, to the humidity changes of said diols, to err of the weighing of the starting materials, or to the humidity changes of the atmospheres when said polymerization is practised, and these variations are often occurred in the practice of the above mentioned invention.

The object of the present invention is to minimize the differences among the batches by heat-treating said crushed polyurethane elastomeric products in the presence of an amide.

One of the other objects is to produce the crushed polyurethane elastomeric products for easy handling to transportation by packaging in the case.

Another object of the present invention is to produce the linear polyurethane elastomer and the readily soluble elastomer in the solvent.

The crushed polyurethane elastomeric products using in the practice of the present invention are produced by the steps of (1) mechanically mixing (a) a polymeric diol having a molecular weight of from about 400 to about 8000, (b) a monomeric diol having a molecular weight of from 62 to about 400, and (c) an organic diisocyanate,
(2) continuing said mechanical mixing after polyurethane has reached a solid state, and
(3) crushing said polyurethane in the presence of an amide to form a pulverized elastomer by continued mechanical mixing.

In the steps of producing crushed polyurethane products, the polymerization temperature is regulated below 100° C. and preferably below 80° C. to promote the polymerization degree and to avoid the degradation of the polymerization degree.

A polymeric diol terminated with hydroxyl groups and having a molecular weight of about 400 to about 8000, which are useful in the present invention, are preferably polyesters, polyethers and polyester ethers. Polyacetals, polyoxysilanes or their mixtures, may be used.

Suitable polyesters are those obtained by poly-condensation of aliphatic dicarboxylic acids such as adipic acid and sebacic acid with glycols such as ethylene glycol, propylene glycol, butylene glycol, pentylene glycol, hexamethylene glycol, and cyclohexane dimethanol, and polyesters such as polycaprolactone obtained by ring-opening polymerization of lactone.

Suitable polyethers are polyalkylene glycols, such as polyethylene glycol, polypropylene glycol, and polytetramethylene glycol (polybutylene glycol).

Suitable polyester ethers are those obtained by polycondensation of aliphatic dicarboxylic acids such as adipic acid, sebacic acid, and succinic acid with glycols such as diethylene glycol, triethylene glycol and tetraethylene glycol.

Useful organic diisocyanates as materials for the polyurethane resins which are employed in the present invention include naphthylene diisocyanate, 4,4'-diphenylmethane diisocyanate, diphenyl diisocyanate, tolylene diisocyanate, phenylene diisocyanate, and diphenylether diisocyanate. Aliphatic diisocyanates, such as hexamethylene diisocyanate may also serve the purpose.

The monomeric diols of the starting materials for the polyurethane elastomer to be used in the invention include diols having a molecular weight of not more than 400, for example ethylene gyclol, propylene glycol, butylene glycol and hexamethylene glycol, diethylene glycol, triethylene glycol, tetraethylene glycol, dioxyphenyl alkane, phenylene-bis-(hydroxyethylether), and also short-chain polyesters, such as low-molecular-weight polyethylene terephthalate. Low-molecular-weight diols having tertiary nitrogen atoms in the molecules may also be used, including, for example, N-methyldiethanolamine, N-ethyldiethanolamine, N-propyldiethanolamine, N-butyldiethanolamine, N - cyclohexyldiethanolamine, N - methyldiisopropanolamine, N - ethyldiisopropanolamine, N - propyldiisopropanolamine, N - butyldiisopropanolamine, N-phenyldiethanolamine, N - tolyldiethanolamine, N-phenyldiisopropanolamine, N - tolyldiisopropanolamine, N-α-methylbenzyldiethanolamine, and N-α-methylbenzyldiisopropanolamine. Further, diols having quaternary nitrogen atoms in the molecules, which are obtained by reacting those low-molecular-weight diols having tertiary nitrogen atoms with alkyl halide, alkyl sulfate, alkylester of carboxylic acid, alkyl ester of toluenesulfonic acid, and the like may also be employed. By using one of these monomeric diols having tertiary or quaternary nitrogen atoms as one component of the polymer according to the invention, it is possible to obtain end products having remarkably improved dyeability and resistances to light and yellowing. In the present invention, polyurethane resins prepared by using two or more of the above-mentioned low-molecular-weight diols may be used as well.

In the synthesis of a polyurethane elastomer for use in the method of the present invention, if the ternary components of a polymeric diol, organic diisocyanate and a monomeric diol are charged in such proportions that the mole ratio of the NCO groups to OH groups in the components is not more than 1.0, then the resulting polyurethane elastomer will have a low polymerization degree and be not satisfactory in quality that it will not suit the purpose of the invention. If the NCO groups are extremely excess as in a mole ratio of the NCO group to OH group being more than 1.3, the NCO groups will tend to be trimerized to provide a stable branched structure. This will again have an undesirable effect on the quality of the product and prolong the time required for lowering the polymerization degree of the product with heat. Thus, such ratio is also not suitable for the method of the invention. Most desirable for the invention are polyurethane resins obtained by charging proportions in which the ratios of NCO groups to OH groups are in the range of 1.0 to 1.3.

Amides which may be used in the invention include dialkyl formamides, such as, dimethyl formamide and diethyl formamide; dialkyl acetamides, such as, dimethyl acetamide and diethyl acetamide; N-alkylpyrrolidone; N-alkylpiperidone; N-alkyldioxypiperidione; and N-alkylcaprolactam, wherein said alkyl groups have been 1 to 5 carbon atoms.

Among these amides, dimethyl formamide, diethyl formamide, diethyl acetamide diethyl acetamide are preferable and further dimethyl formamide and dimethyl acetamide are most preferable.

In the process of the crushed polyurethane elastomeric products, the crushing of solid polyurethane elastomer is carried out in the presence of an amide, which is amount of at least 5 percent and below 60 percent based on the weight of the total weight of polyurethane elastomer and an amide.

If the ratio of said amide in the charge is increased the pulverized or crushed elastomer is converted into a solution state and the removal of said amide is difficult when said crushed elastomer is directed to effect extrusion molding.

The characteristics of the present invention's process is consisted in to add the further heat treating step to the crushed polyurethane elastomeric product which is produced by the above-mentioned process.

The crushed polyurethane elastomeric products produced by the process described in U.S. Pat. No. 3,446,771, especially, when the charged molar ratio of NCO groups contained in an organic diisocyanate and OH groups contained in both diols is at the range of between above 1:1 to 1.3 to 1.0, have the three dimensional structures in the molecule such as allophanate bond. And these products are hardly insoluble in the solvent such as dimethyl formamide, dimethyl acetamide etc. but the viscosity of the solution, which is produced by dissolving said products into the solvent, is not stable. And the viscosity of said solution varies according to the lapse of the time.

This invention aims to break the cross linkage of the product, such as allophanate bonds by heat-treating in the presence of an amide to produce the product having linear structures, and to lower the polymerization degree down to the state where the product can be readily dissolved and then the heat-treating is stepped at a point of a desired polymerization degree, whereby the polymerization degree can be adjusted as desired.

The heat-treating temperature adopted to practise the present invention is at the range of between 80° C. to 155° C. especially above 100° C. to 155° C. is preferred.

As regards the temperature for heating polyurethane elastomer according to the method of the invention, it is to be noted that, for example, the polymers undergo no changes on heating at room temperature for as long as several days but that the advantages of the present invention are attained only by heating at a temperature above 80° C. especially above 100° C. Considering the rate of decrease of the polymerization degree and the possibilities of polymer decomposition and discoloration at elevated temperatures, the heating to a temperature above 155° C. is not desirable. Actually, therefore, optimum temperatures range from above 100° to 150° C.

An amide used in the present invention is the same agent used in the process of the U.S. Patent No. 3,446,771, which is selected from the group consisting of dialkyl formamides, dialkyl acetamide, wherein said alkyls have the carbon numbers of 1 to 5. Dimethyl formamide and dimethyl acetamide are preferable.

The amide which is used in the present invention tends to react gradually with NCO groups at a high temperature, particularly above 100° C., and it appears that a urethane bond and NCO group are formed from the instable branched allophanate bond by heating due to a dissociation as in the present invention, an amide reacts with the formed NCO group to facilitate the dissociation of the allophanate bond and promote the decrease of the polymerization degree. Therefore, unreacted NCO groups no longer remain in the powdery polyurethane resin containing an amide which has been cooled and taken out. The product when allowed to stand undergoes no change in the polymerization degree and can be stored for an extended period of time. Thus, in the polyurethane elastomer obtained by the method of the invention, there is no instable bond but a stable, substantially linear structure exists.

Thus obtained products are homogeneous in the molecular structures and the molecular weights, and have excellent insolubilities, good storage stabilities and easy handling to transportation.

The products are commercially transported by packaging said products in the sealed cases such as polyethylene packing case. And the packed products are not changed in qualities such as, solubility property, colors, etc. for the long time. The products are convenienced to produce the polyurethane elastomeric solution instantly and the thus obtained solutions are stable in viscosity for the long time. Therefore these solutions are preferable for the production of elastic filaments, films, leather substitutes or the coating of the various articles.

The present invention is illustrated by the following examples.

EXAMPLE 1

(1) Production of the crushed polyurethane elastomer according to the method of U.S. Patent No. 3,446,771

A mixture consisting of 1,700 g. of polybutylene adipate, which is terminated with hydroxyl groups and has an average molecular weight of about 2,000, 211 g. of ethylene glycol and 335 g. of dimethyl formamide was charged into a Werner mixer having a capacity of 15 l. and the heat jacket. The charged mixture was kept at the temperature of about 40° C. and stirred until it was thoroughly homogenized.

Then, 1,105 g. of solid 4.4′-diphenyl methane diisocyanate was charged into said mixer, and continued said stirring for 10 minutes. Thereafter, a reaction medium in the mixer was heated up to 70° C. by circulating a hot liquid through the jacket.

The charged mixer was gradually converted from liquid to paste and paste to solid according to increase the polymerization degree of polyurethane elastomer, which was produced from the reaction of polybutylene adipate, ethylene glycol and 4.4′-phenyl methane diisocyanate.

The resulting elastomer was crushed and converted into the crushed polyurethane elastomer like flakes, which contains dimethyl formamide, after 55 minutes from the beginning of the reaction.

(2) The heat-treating step of the present invention 340 g. of dimethyl formamide was added into the crushed polyurethane elastomer, which was produced by the above mentioned process, and then allowed to the condition at temperature of about 130° C. for 4 hours.

Thus obtained elastomeric product has the almost same feature with the product of the above-mentioned process (1), but excellent in the following points:

(i) When they are dissolved in dimethyl formamide at 30° C. to prepare the elastomeric solutions, the product of the present invention is instantly dissolved into said solvent and makes a clear solution, but the product of the process (1) takes about three times to dissolve it compared with the case of the product of the present invention and the obtained solution is a little cloudy. And to obtain a clear solution it needs to stand about one hour.

(ii) The intrinsic viscosities of both solutions produced by the above-mentioned process are 0.95 at the flesh solutions. Both solutions are extruded from the slit into water of 30° C. to make films. Then, these films were immersed in water of 80° C. for 3 days and said films are re-dissolved into dimethyl formamide to make polyurethane elastomeric solutions. The intrinsic viscosities of thus obtained solutions are changed to 0.93 (the product of the present invention) and 0.85 (the product of the above-mentioned process (1)) respectively. This result shows that the elastomer of the present invention is superior to the one of the above-mentioned process (1) at the point of the hydrolysis-resistance with the attack of hot water.

As the products of the present invention have the crushed or pulverized form like flakes, they can be easily packed into the packing cases such as polyethylene packing case and transported from the produced place to the consumers.

EXAMPLE 2

(1) Production of the crushed polyurethane according to the method of U.S. Patent No. 3,446,771

A mixture consisting of 12.0 kg. of polyethylene propylene adipate (molar ratio of ethylene glycol to propylene glycol=9:1) having hydroxyl groups at both ends and a molecular weight of about 2,000, and 1.487 kg. of ethylene glycol was charged into a Werner mixer having a capacity of 50 l. and the heat jacket. The charged mixture was kept at the temperature of about 45° C. and stirred until it was homogenized.

Then, 7.725 kg. of solid 4.4′-diphenyl methane diisocyanate maintained at the room temperature was charged into said mixer, and continued said stirring with the jacket temperature raised up to 60° C.

The charged mixture was gradually converted from liquid to paste and the volume of said mixture was swelled up in the mixer. Fifty minutes after the addition of said diisocyanate, 3.7 kg. of dimethyl formamide was added into the mixture and homogenized with the mixture by stirring. In 10 minutes, the mixture became homogeneous with dimethyl formamide, and the jacket temperature was raised up to 75° C. The charged mixture became the pasty state and then, 40 minutes after addition of dimethyl formamide, it was converted to solid state and began to pulverize. When the stirring was kept on for 2 hours after the beginning of pulverization, the crushed polyurethane elastomer was obtained.

(2) The heat-treating step of the present invention

The thus obtained polyurethane elastomer containing dimethylformamide was divided into 2 kg. portions, which were then placed in a kneader having a capacity of 5 l. at different heating temperatures and the changes in the polymerization degree were observed. The results are shown in the table below, in which the polymerization degree is expressed in terms of the viscosity (in poises) of a ten percent polymer solution in dimethyl formamide.

TABLE

| Heating time, hours: | Heating temperature, °C. | | | |
|---|---|---|---|---|
| | 75 | 90 | 115 | 155 |
| 0 | 8.5 | 8.5 | 8.5 | 8.5 |
| 0.5 | 8.6 | 7.3 | 6.4 | [1] 5.0 |
| 1 | 8.4 | 6.0 | 4.9 | [1] 3.0 |
| 2 | 8.5 | 4.6 | 3.3 | [1] 0.6 |
| 3 | 8.6 | 3.6 | 2.5 | [1] 0.2 |
| 5 | 8.5 | 2.5 | 1.6 | |
| 7 | 8.2 | 2.2 | 1.7 | |
| 10 | 3.3 | 2.0 | 1.5 | |

[1] Discolored.

As can be seen from the foregoing table, the higher the temperature at which the elastomer is heated, the rate of decrease of the polymerization degree and the degradation of the allophanate bond in the molecule the faster, but this is not desirable because the elastomer is decomposed by heat and discoloured in yellow or brown. While the polymerization degree will not drop at relatively low temperatures, say at 75° C., at 90° C. or 115° C. the viscosity decreases gradually. Thus, it is evident that the polymerization degree can be easily adjusted by discontinuing the heat-treating at the point where the viscosity of polyurethane elastomer reaches a desired viscosity value, which is in the range of 1.0 to 3.0 poises in the form of a 10% polymer solution of dimethyl formamide.

The product by heat-treating at the temperature of 115° C. for 3 hours has the feature of the crushed flakes, it dissolves instantly in dimethyl formamide and makes a clear solution.

And the product thus obtained consists the homogeneous elastomer having good storage stability in the form of crushed solid state.

The products prodced by the same condition of heat-treating are minimized the difference among the batches.

We claim:

1. In the process of producing the crushed polyurethane elastomeric products which contain an amide by
   (1) mechanically mixing while polymerizing to form a polyurethane (a) a polymeric diol having a molecular weight from about 400 to about 8,000, (b) a monomeric diol having a molecular weight of from 62 to about 400, and (c) an organic diisocyanate,
   (2) continuing said mechanical mixing after said polyurethane has reached a solid state, and
   (3) crushing said polyurethane to form a pulverized elastomer by continued mechanical mixing in the presence of an amide selected from the group consisting of dialkyl formamides, and dialkyl acetamides, wherein (i) said alkyl groups have 1 to 5 carbon atoms and (ii) said amide is present in an amount of between about 5% to about 60% by weight of said diols, said diisocyanates and said amide, the improvement which comprises heat-treating said crushed polyurethane elastomeric products at the temperature of between 101° C. to 155° C. in the presence of about 2 to 60 percent of said amide based on the total weight of said polyurethane elastomeric products and an amide, to obtain the readily soluble polyurethane elastomeric products having homogeneous molecular weight and linear structure.

2. The process of claim 1 wherein said amide is dimethyl formamide.

3. The process of claim 1 wherein said polymerization between an organic diisocyanate and diols is carried out at the ratio of NCO groups in an organic diisocyanate and OH groups in the diols being at the range of above 1.0 to 1.3.

4. The crushed polyurethane elastomeric product produced by the method of claim 1.

References Cited

UNITED STATES PATENTS

| | | | |
|---|---|---|---|
| 3,384,623 | 5/1968 | Inoue et al. | 260—75 |
| 3,420,796 | 1/1969 | Matsubayashi et al. | 260—47 |
| 3,446,771 | 5/1969 | Matsubayashi et al. | 260—45.85 |
| 3,184,426 | 5/1965 | Thoma et al. | 260—30.8 |
| 3,473,957 | 10/1969 | Porrmann et al. | 117—161 |

OTHER REFERENCES

Kittila: Dimethylformamide Chemical Uses, E. I. du Pont de Nemours & Co., Inc., Wilmington, Del. (1967), p. 194.

DONALD E. CZAJA, Primary Examiner

H. S. COCKERAM, Assistant Examiner

U.S. Cl. X.R.

260—77.5 A A, 77.5 R, 77.5 S P